(12) United States Patent
Vauchel et al.

(10) Patent No.: US 8,800,258 B2
(45) Date of Patent: Aug. 12, 2014

(54) AIR INTAKE STRUCTURE TO BE MOUNTED UPSTREAM OF A NACELLE MIDDLE STRUCTURE FOR AIRCRAFT ENGINE, AND NACELLE EQUIPPED WITH SUCH AIR INTAKE STRUCTURE

(75) Inventors: Guy Bernard Vauchel, Le Havre (FR); Stephane Beilliard, Toulouse (FR); Jean-Philippe Dauguet, Tournefeuille (FR)

(73) Assignee: Aircelle, Gonfreville l'Orcher (FR)

( * ) Notice: Subject to any disclaimer, the term of this patent is extended or adjusted under 35 U.S.C. 154(b) by 1041 days.

(21) Appl. No.: 12/681,994

(22) PCT Filed: Aug. 28, 2008

(86) PCT No.: PCT/FR2008/001208
§ 371 (c)(1),
(2), (4) Date: Apr. 7, 2010

(87) PCT Pub. No.: WO2009/060137
PCT Pub. Date: May 14, 2009

(65) Prior Publication Data
US 2010/0242428 A1 Sep. 30, 2010

(30) Foreign Application Priority Data
Oct. 8, 2007 (FR) ...................................... 07 07049

(51) Int. Cl.
| | | |
|---|---|---|
| F02G 3/00 | (2006.01) |
| F02C 7/20 | (2006.01) |
| B64D 33/02 | (2006.01) |
| F02C 7/047 | (2006.01) |
| B64D 15/04 | (2006.01) |

(52) U.S. Cl.
CPC ................ *B64D 33/02* (2013.01); *F02C 7/047* (2013.01); *Y02T 50/671* (2013.01); *B64D 2033/0233* (2013.01); *B64D 15/04* (2013.01)
USPC .......................................... 60/39.093; 60/798

(58) Field of Classification Search
USPC .............. 60/39.091, 39.093, 798; 244/134 B, 244/134 R
See application file for complete search history.

(56) References Cited

U.S. PATENT DOCUMENTS
4,757,963 A * 7/1988 Cole .......................... 244/134 B FOREIGN PATENT DOCUMENTS
| EP | 0918150 | 5/1999 |
|---|---|---|
| FR | 608599 | 7/1926 |
| FR | 2757823 | 7/1998 |
| FR | 2886674 | 12/2006 |

* cited by examiner

*Primary Examiner* — Gerald L Sung
*Assistant Examiner* — Scott Walthour
(74) *Attorney, Agent, or Firm* — Brinks Gilson & Lione

(57) ABSTRACT

An air intake structure is mounted upstream of a mid-structure of a nacelle for an aircraft engine. The air intake structure includes an external wall incorporating a lip, a partition defining a deicing compartment in the lip, a deicing manifold extending in the compartment, and a duct for supplying hot air to the deicing manifold. In particular, the external wall is mounted movably with respect to the mid-structure between a rear position and a front position, and the duct is connected in a fixed manner to the mid-structure. The partition is fixed in a sealed manner inside the lip, and the duct is connected to the manifold by a disconnectable seal which is situated in an immediate vicinity of the partition.

12 Claims, 5 Drawing Sheets

AIR INTAKE STRUCTURE TO BE MOUNTED UPSTREAM OF A NACELLE MIDDLE STRUCTURE FOR AIRCRAFT ENGINE, AND NACELLE EQUIPPED WITH SUCH AIR INTAKE STRUCTURE

TECHNICAL FIELD

The present invention relates to an air intake structure designed to be mounted upstream of a mid-structure of a nacelle for an aircraft engine, and to a nacelle equipped with such an air intake structure.

BACKGROUND

In its patent application FRO6/08599, filed on 2 Oct. 2006, the applicant described (see FIGS. 1 to 3 appended) a nacelle 1 for an aircraft engine comprising an air intake structure 3 designed to be mounted upstream of a mid-structure 5, said air intake structure 3 comprising in particular:
- an external wall 7 incorporating a lip 9 and designed to be mounted movably with respect to said mid-structure 5 between a rear position (FIG. 2) and a front position (FIG. 3),
- a partition 11 defining a deicing compartment 13 in said lip 9,
- at least one deicing manifold 15 extending in said compartment 13, and
- at least one duct 17 for supplying hot air to said manifold 15, which duct is designed to be connected in a fixed manner to said mid-structure 5.

In order to seal the deicing compartment 13 when the external wall 7 is in the rear position (FIG. 2), that is to say in the normal operating position, it is necessary to provide seals 19a, 19b secured to the upper and lower parts of the partition 11.

In practice, the sealing obtained with these seals is not completely satisfactory: the successive opening and closing of the external wall 7, required for maintenance operations, have the effect of modifying the positioning and the shape of this seal, with the result that in time leaks of deicing hot air have a tendency to appear between the compartment 13 and the region 21 of the air intake structure 1 situated downstream of the partition 11.

The intake of deicing hot air in this region 21 is not desirable since it risks damaging certain equipment, in particular electrical and electronic equipment, situated in this region.

Document FR2757823 discloses the principle of a pipe for supplying hot air to a deicing compartment, comprising a part mounted on the fixed mid-structure of the nacelle and a part mounted on the movable air intake structure, these two pipe parts being connected in a disconnectable manner to one another.

Although it makes it possible to overcome the aforementioned sealing problem, this device of the prior art has the disadvantage of substantially increasing the weight of the movable part of the air intake structure.

BRIEF SUMMARY

The aim of the present invention is to overcome all of the aforementioned disadvantages.

The invention provides an air intake structure designed to be mounted upstream of a mid-structure of a nacelle for an aircraft engine, said air intake structure comprising in particular:
- an external wall incorporating a lip and designed to be mounted movably with respect to said mid-structure between a rear position and a front position,
- a partition defining a deicing compartment in said lip,
- at least one deicing manifold extending in said compartment,
- at least one duct for supplying hot air to said manifold, which duct is designed to be connected in a fixed manner to said mid-structure,
- in which structure said partition is fixed in a sealed manner inside said lip, and said supply duct is connected to said manifold by disconnectable sealed means, this structure being noteworthy in that said disconnectable sealed means are situated in the immediate vicinity of said partition.

Thus, the partition provides perfect sealing of the deicing compartment, the disconnectable sealed means provide sealed fluid communication between the hot air supply duct and the manifold, and given the immediate proximity of these disconnectable sealed means with the partition, the length of the hot air manifold is reduced to a minimum, with the result that the excess weight brought by this manifold to the movable part (external wall+deicing manifold+partition) of the air intake structure is also minimal.

It should also be noted that, consequently, the cost of replacing this movable part of the air intake structure is for its part also minimal.

- the internal face of said air intake structure is designed to be mounted in a fixed manner on said mid-structure: this particular embodiment corresponds to that described in the patent application mentioned above, in which this internal face is in fact a cylindrical wall provided with a noise absorption structure;
- said external wall is designed to be mounted in a sliding manner on said mid-structure: this particular embodiment also corresponds to one of those described in said patent application, and permits an easy movement of the internal structure between its rear (normal operation) and front (maintenance) positions;
- said disconnectable sealed means comprise a manifold end and a supply duct end which are male and female, or vice versa, and sealing means such as at least one seal mounted on or inside these ends: these male and female ends allow a rapid connection/disconnection between the supply duct and the deicing manifold, without adjustment of diameter and length dimensions. This therefore allows a good tolerance to the manufacturing deviations of the various components involved;
- said female end has a funnel shape: this particular shape allows the male end to be guided in the female end during the connection;
- said manifold end passes through said partition in a sealed manner: this particular embodiment is of a particularly simple design;
- said partition defines a housing around said manifold end, sealing means such as seals being interposed on the one hand between this manifold end and the end of said supply duct, and on the other hand between said partition and this end of the supply duct: in the case of a leakage of the sealing means interposed between the manifold end and the end of the supply duct, the hot air remains confined in the housing and therefore does not spread downstream of the partition;
- said partition defines an orifice traversed in a nonsealed manner by said manifold end, sealing means such as seals being interposed, on the one hand between this manifold end and the end of said supply duct, and on the other hand between the edges of said orifice and this supply duct end: in the case of a leakage of the sealing means interposed between the manifold end and the end of the supply duct, the hot air remains confined in the deicing compartment, and therefore does not spread downstream of the partition;

said supply duct comprises a double wall: such a double wall makes it possible to prevent the hot air circulating in the duct from escaping into the region situated downstream of the partition in the event of the internal wall of this duct bursting;

said supply duct comprises at its end at least one orifice for communication between said housing and the space situated between the two duct walls: this orifice makes it possible to avoid the pressurization of this housing in the event of leakage through the sealing means situated between the end of the manifold and the end of the supply duct, and therefore to avoid the risk of leakage through the sealing means situated between this housing and this supply duct end;

this air intake structure comprises an air leak detector arranged in the space situated between the two walls of the supply duct: this detector makes it possible to signal any hot air escape at the sealing means situated between the end of the manifold and the end of the supply duct.

The present invention also relates to a nacelle for an aircraft engine, which is noteworthy in that it comprises an air intake structure according to the foregoing.

BRIEF DESCRIPTION OF THE DRAWINGS

Other features and advantages of the present invention will become apparent in light of the description which follows and from an examination of the appended figures, in which.

DETAILED DESCRIPTION

In all the figures of the present patent application, identical references designate members or a set of members which are identical or analogous.

Figure 4:
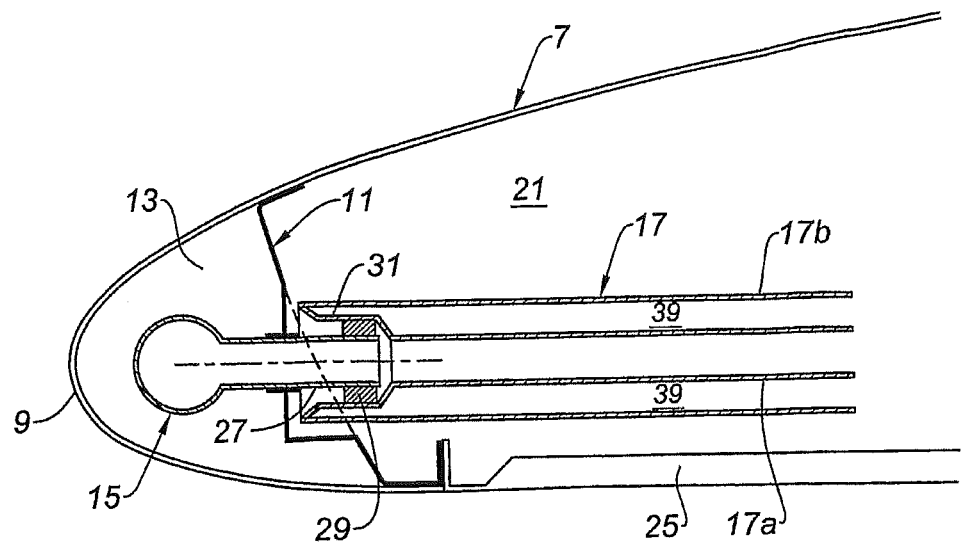
FIGS. 4 and 5 are views analogous to FIGS. 2 and 3 of a first embodiment of an air intake structure according to the invention.

As can be seen in FIG. 4, the air intake structure according to the invention comprises an external wall 7 incorporating a lip 9.

The lip 9 is the part of the air intake structure situated furthest upstream, that is to say the part of this air intake structure which as it were constitutes the leading edge thereof.

Figure 1:
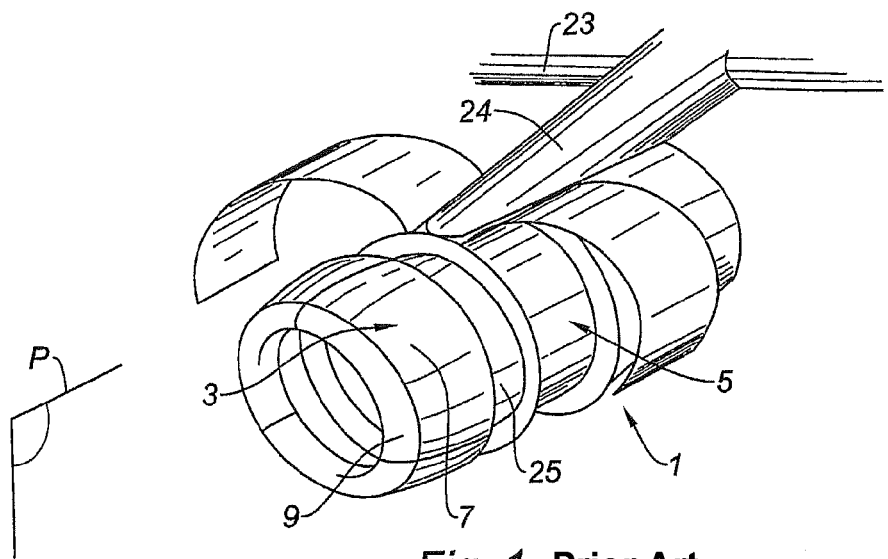
FIG. 1 represents in perspective a nacelle of the prior art, described in the preamble of the present description, suspended below an airplane wing 23 by means of a pylori 24.
Figure 2:
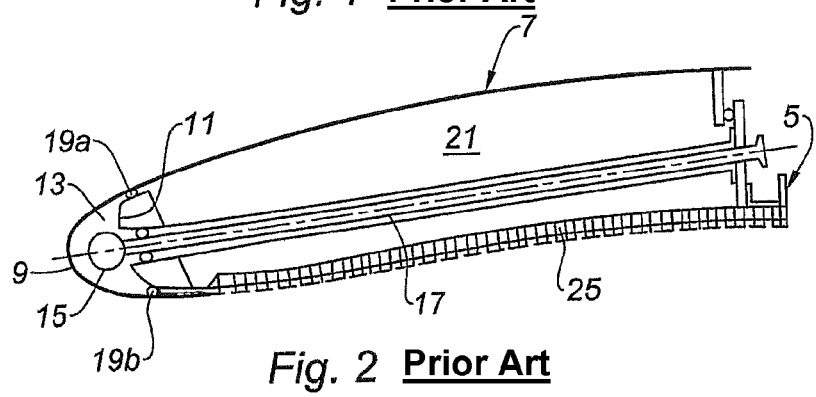
FIGS. 2 and 3 represent views in axial section, that is to say taken on the plane P in FIG. 1, of the upper part of the air intake structure of this nacelle of the prior art, in respective normal operating and maintenance positions.
Figure 3:
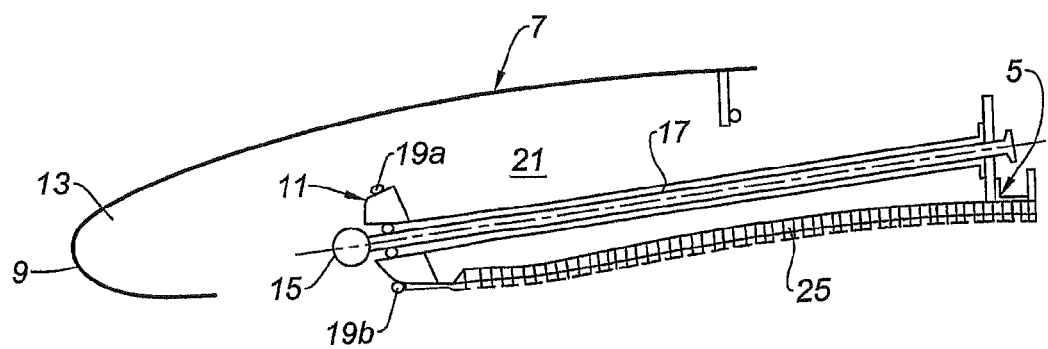
Figure 5:
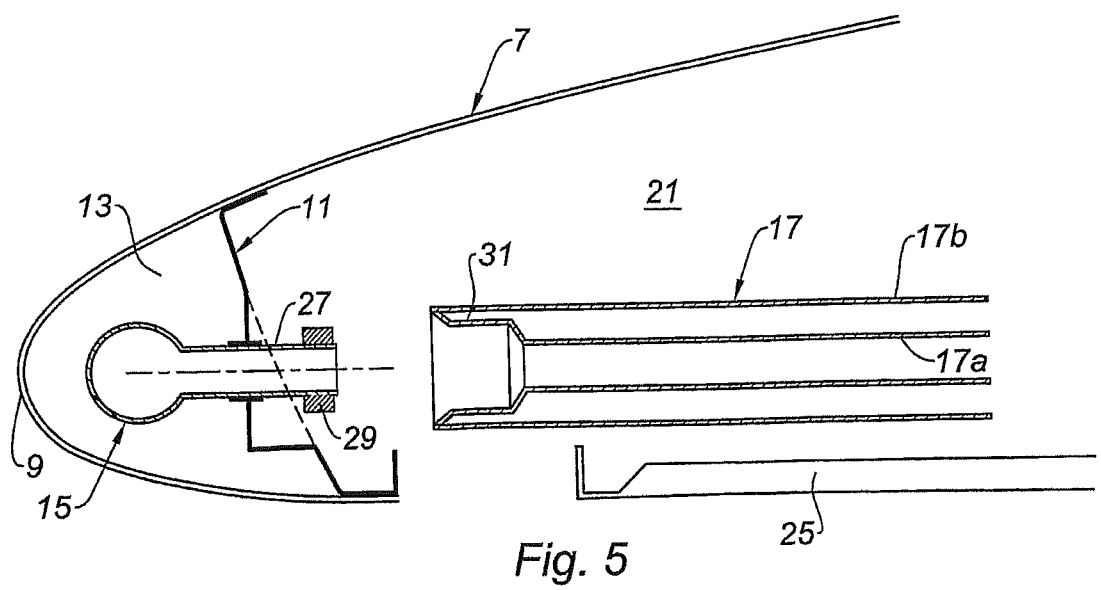

As indicated in the subject of FIGS. 2 and 3, the assembly formed by the external wall 7 and its lip 9 is mounted slidably between a rear position represented in FIG. 4 and a front position represented in FIG. 5, with respect to a fixed mid-structure 5 of the nacelle (not visible in FIGS. 4 and 5).

The normal operating configuration is that shown in FIG. 4, the configuration of FIG. 5 being a maintenance configuration allowing access in particular to the fixed mid-structure 5 of the nacelle.

The air intake structure according to the invention also comprises an internal wall 25, mounted in a fixed manner on the mid-structure 5.

Conventionally, the fixed internal wall 25 comprises an acoustic treatment, that is to say that it can be covered by a honeycomb structure designed to reduce sound emissions.

Inside the lip 9 is situated a deicing manifold 15 designed to circle, inside this lip, hot air coming from a supply duct 17 itself connected to a hot air source mounted fixedly with respect to the mid-structure 5.

A partition 11 delimits the deicing compartment 13, inside which the manifold 15 extends.

This partition is fastened in a sealed manner, for example by riveting, inside the lip 9.

In the embodiment represented in FIGS. 4 and 5, the manifold 15 comprises at least one end 27 passing through the partition 11 in a sealed manner, this end 27 being able, for example, to be welded at its periphery to the partition 11.

This end 27 comprises sealing means 29 and is able to enter inside a funnel-shaped female part 31 forming the end of the hot air supply duct 17.

The expression "sealing means" used in the context of the present invention denotes any sealing system designed to withstand the high temperatures of the hot air circulating in the duct 17 (typically of around 500° C.) and tolerating the sliding movement.

These sealing means can in particular be formed by seals of suitable materials.

In the normal operating position, represented in FIG. 4, the end 27 of the manifold 15 is therefore situated inside the end 31 of the duct 17, and forms a sealed connection therewith.

In the maintenance position, represented in FIG. 5, the external wall 7 incorporating the lip 9, and hence the partition 11 and the manifold 15, are moved toward the front of the nacelle, that is to say in this case toward the left in the figure.

In so doing, the male end 27 of the manifold 15 is disengaged from the female end 31 of the duct 17.

It may be noted that the duct 17 preferably comprises an internal wall 17a and an external wall 17b so as to limit the risks of hot air escaping inside the region 21 in the event of the wall 17a bursting.

Figure 6:
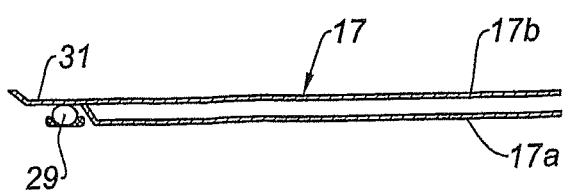
FIG. 6 is a partial view of a supply duct of this air intake structure.

According to a variant visible in FIG. 6, it can be seen that the funnel shape of the end 31 of the duct 17 can be formed on the external wall 17b of the duct 17, thus allowing a saving in the duct diameter and also a weight saving.

Figure 7:
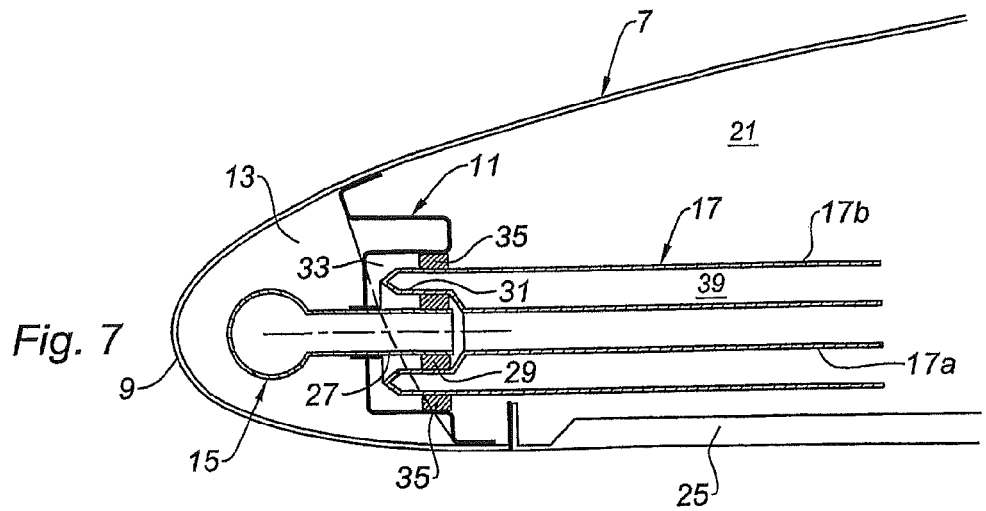
FIGS. 7 and 8 are views analogous to FIGS. 2 and 3 of a second embodiment of an air structure according to the invention.
Figure 8:
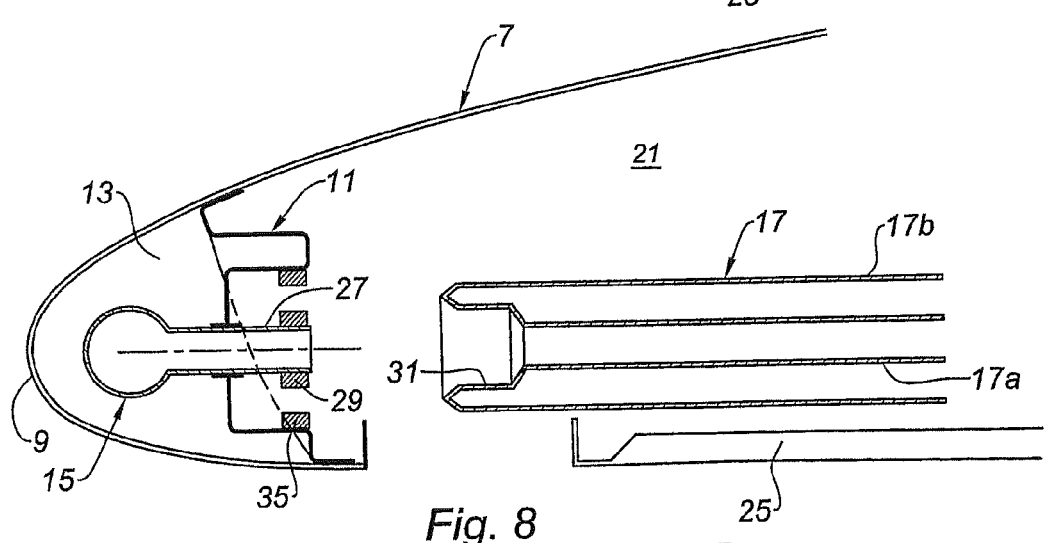

In the embodiment in FIGS. 7 and 8, the partition 11 defines a housing 33 around the end 31 of the duct 17, second sealing means 35 sealing this housing with respect to the region 21 when the air intake structure is in the normal operating configuration.

This particular arrangement makes it possible to contain within the housing 33 any leakage of hot air due to poor sealing of the sealing means 29.

Figure 9:
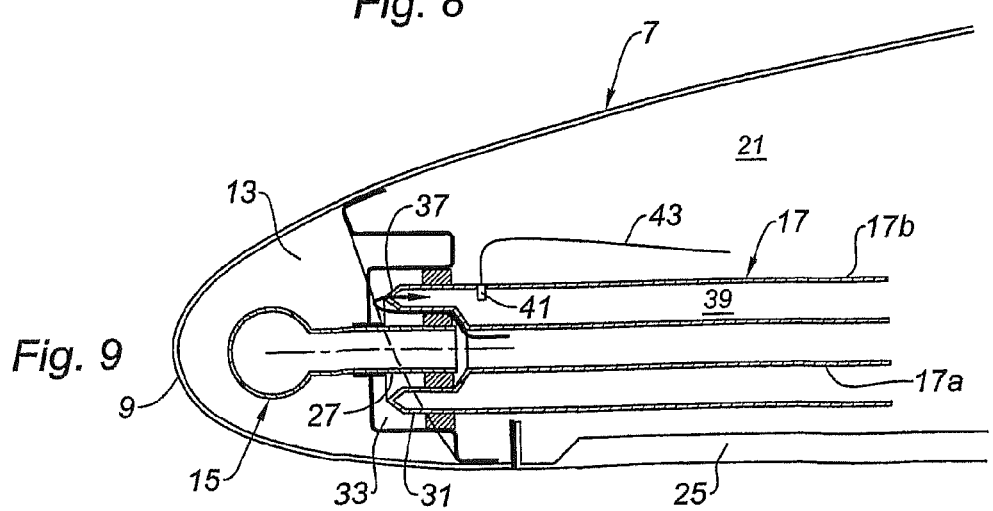
FIG. 9 is a view analogous to that in FIG. 7 of a variant of this second embodiment.

In the variant represented in FIG. 9, it can be seen that a communication orifice 37 can be provided between the housing 33 and the space 39 situated between the two walls 17a and 17b of the supply duct.

This orifice 37 makes it possible to avoid the pressurization of the housing 33 in the event of leakage through the sealing means 29; this makes it possible to limit the risk of leakage of this air through the second sealing means 35 in the direction of the region 21.

Advantageously, a leak detector 41 housed in a space 39 can be provided, this air leak detector being itself connected by a suitable electrical connection 43 to a control system.

Figure 10:
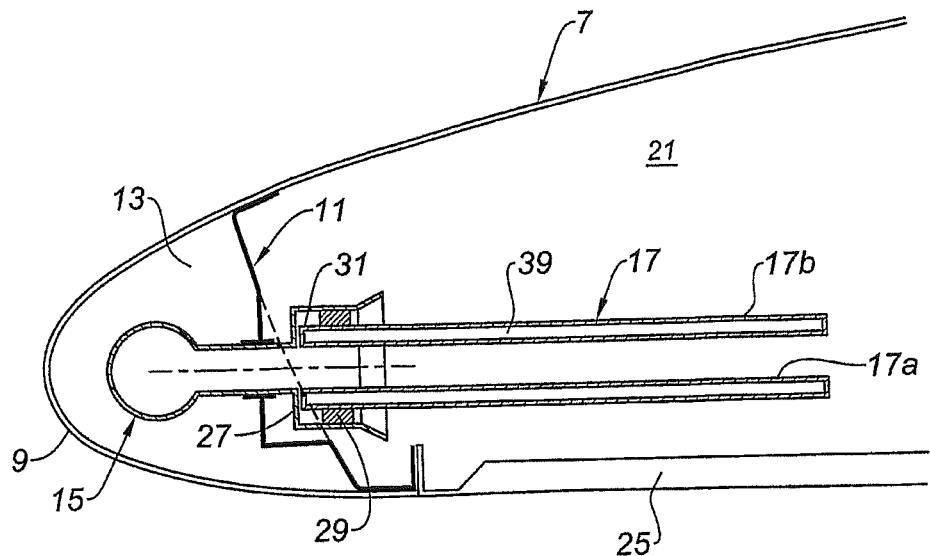
FIGS. 10 and 11 are analogous views respectively to FIGS. 2 and 3 of a third embodiment of an air structure according to the invention.
Figure 11:
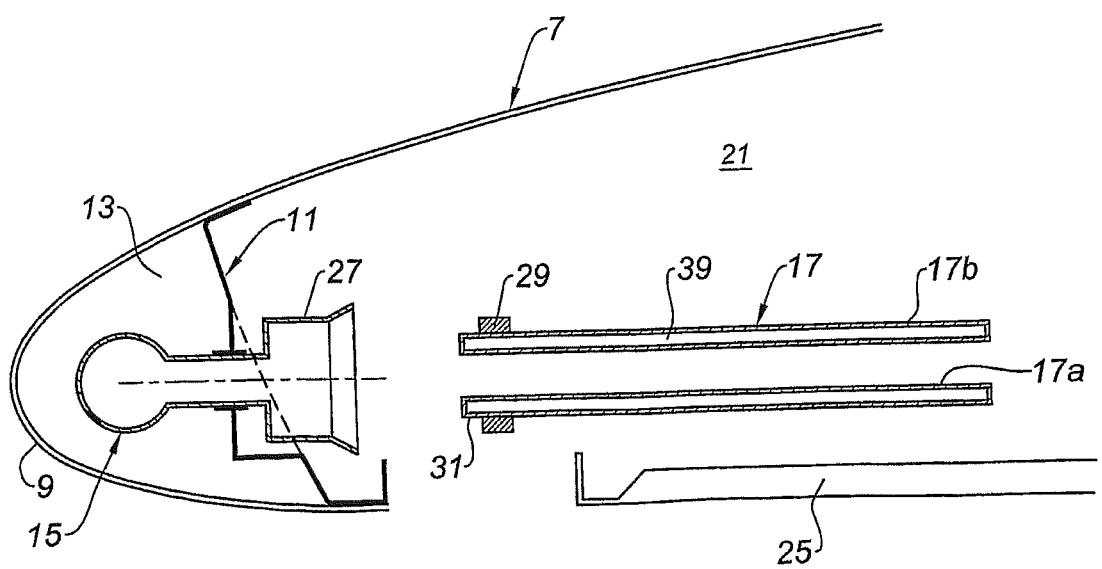

The embodiment represented in FIGS. 10 and 11 differs from the preceding ones in that it is the end 27 of the manifold 15 which has a funnel shape, the end 31 of the duct 17 for its part having a straight shape: in this embodiment, the end 27 of the manifold 15 and the end 31 of the duct 17 respectively constitute the female and male parts of this disconnectable sealed connection.

The sealing means 29 which provide sealing for this connection are in this case preferably arranged around the end 31 of the duct 17.

Figure 12:
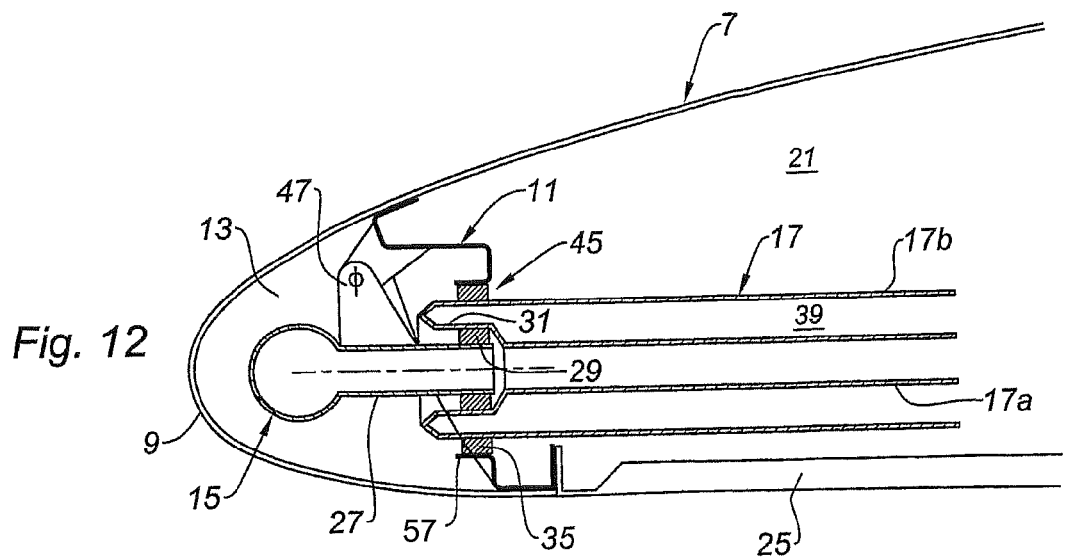
FIGS. 12 and 13 are analogous views respectively to FIGS. 2 and 3 of a fourth embodiment of an air intake structure according to the invention.
Figure 13:
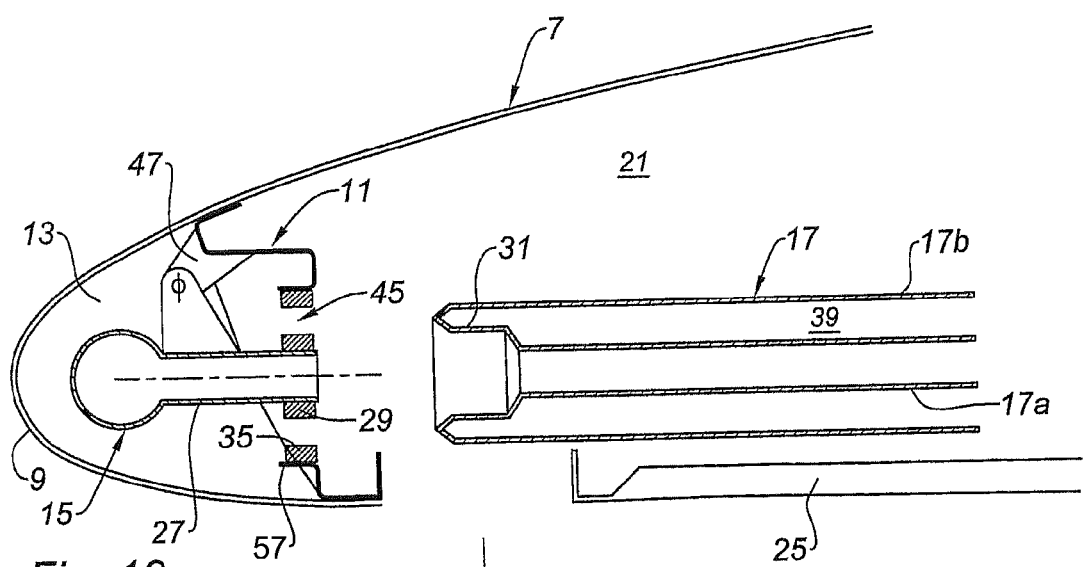

In the variant represented in FIGS. 12 and 13, the end 27 of the manifold 15 is no longer connected to the partition 11, but passes in a nonsealed manner through an orifice 45 formed in this partition 11.

Figure 14:
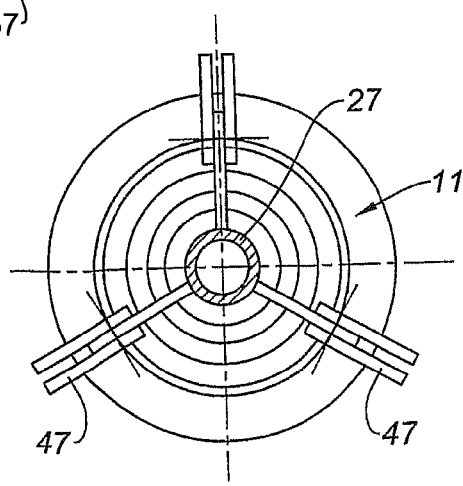
FIG. 14 is an axial view of the manner of fastening a deicing manifold end to a partition of the air intake structure represented in FIGS. 12 and 13.

The end 27 of the manifold 15 can be connected to the partition 11 by fittings 47 or by adjustable tie rods arranged at 120°, as is represented in FIG. 14.

First sealing means 29 are interposed between the male end 27 of the manifold 15 and the female end 31 of the duct 17, and second sealing means 35 are interposed between this female end 31 and a return 57 formed in the partition 11.

In the case of a hot air leak through the first sealing means 29, this air emerges directly into the deicing compartment 13, thereby reducing the risk of leakage in the direction of the region 21.

It will be noted that, preferably, as has been represented for all of the embodiments described above, the region of connection between the end 27 of the manifold 15 and the end 31 of the duct 17 is preferably situated in the immediate vicinity, or even in the plane, of the partition 11: this makes it possible to limit the overall weight of the movable parts, that is to say of the parts capable of moving with the external wall 7 during its movement between its normal operating position and its maintenance position.

This weight limitation makes it possible to lighten the means (guide rails, actuating mechanism, etc.) which make it possible to move this external wall between said two positions.

What is more, in the case of damage to the aforementioned movable parts, their replacement is less costly since the elements constituting these movable parts are designed to be just adequate.

It will also be noted that the disconnectable connection between the end 27 of the manifold 15 and the end 31 of the duct 17 allows an easy inspection of the manifold 15 on the one hand and of the duct 17 on the other hand when the external panel 7 is in the maintenance position.

It will further be noted that the disconnectable nature of the connection between the male and female (or vice versa) ends of the manifold 15 and of the duct 17 makes it possible to dispense with an adjustment of diameter and length dimensions: that thus allows a good tolerance to the manufacturing deviations of the various components involved.

Of course, the present invention is in no way limited to the embodiments described and represented, which are provided purely by way of example.

The invention claimed is:

1. An air intake structure mounted upstream of a mid-structure of a nacelle for an aircraft engine, said air intake structure comprising:
    an external wall incorporating a lip and mounted movably with respect to said mid-structure between a rear position and a front position;
    a partition defining a deicing component in said lip;
    at least one deicing manifold extending in said compartment; and
    at least one duct for supplying hot air to said manifold, said duct connected in a fixed manner to said mid-structure,
    wherein said partition is fixed in a sealed manner to said lip, and said duct is connected to said manifold by disconnectable sealed means that is non-rotatable about a longitudinal axis of said duct,
    wherein said disconnectable sealed means are situated in an immediate vicinity of said partition, and
    wherein said deicing manifold is fixedly attached to said partition.

2. The air intake structure according to claim 1, wherein an internal face of said air intake structure is mounted in a fixed manner on said mid-structure.

3. The air intake structure according to claim 1, wherein said external wall is mounted in a sliding manner on said mid-structure.

4. The air intake structure according to claim 1, wherein said disconnectable sealed means comprise an end of the manifold and an end of the duct which are male and female, or vice versa, and sealing means comprising at least one seal mounted on or inside these ends.

5. The air intake structure according to claim 4, wherein said female end has a funnel shape.

6. The air intake structure according to claim 4, wherein said manifold end passes through said partition in a sealed manner.

7. The air intake structure according to claim 6, wherein said partition defines a housing around said end of the manifold, said sealing means being interposed between said end of the manifold and the end of said duct, and between said partition and the end of the duct.

8. The air intake structure according to claim 4, wherein said partition defines an orifice traversed in a nonsealed manner by the end of the manifold, sealing means being interposed, between the end of the manifold and the end of said duct, and between edges of said orifice and the end of the duct.

9. The air intake structure according to claim 1, wherein said duct comprises two walls.

10. The air intake structure according to claim 7, wherein said duct comprises at an end at least one orifice for communication between said housing and a space situated between two walls of the duct.

11. The air intake structure according to claim 9, further comprising an air leak detector arranged in a space situated between the two walls of the duct.

12. A nacelle for an aircraft engine, comprising an air intake structure according to claim 1.

* * * * *